US012049776B2

(12) United States Patent
Jarvis et al.

(10) Patent No.: US 12,049,776 B2
(45) Date of Patent: Jul. 30, 2024

(54) PATCH FITTING

(71) Applicant: METFLAM (LONDON) LIMITED, Harlow (GB)

(72) Inventors: Will Jarvis, Harlow (GB); Neil Blackaller, Harlow (GB)

(73) Assignee: METFLAM (LONDON) LIMITED (GB)

( * ) Notice: Subject to any disclaimer, the term of this patent is extended or adjusted under 35 U.S.C. 154(b) by 224 days.

(21) Appl. No.: 17/617,714

(22) PCT Filed: Jun. 4, 2020

(86) PCT No.: PCT/GB2020/051356
§ 371 (c)(1),
(2) Date: Dec. 9, 2021

(87) PCT Pub. No.: WO2020/254780
PCT Pub. Date: Dec. 24, 2020

(65) Prior Publication Data

US 2022/0235591 A1 Jul. 28, 2022

(30) Foreign Application Priority Data

Jun. 18, 2019 (GB) ..................................... 1908739

(51) Int. Cl.
*E06B 5/16* (2006.01)
*E05D 5/02* (2006.01)
(Continued)

(52) U.S. Cl.
CPC ............ *E05D 5/0246* (2013.01); *E05D 11/00* (2013.01); *E06B 3/025* (2013.01); *E06B 5/161* (2013.01);
(Continued)

(58) Field of Classification Search
None
See application file for complete search history.

(56) References Cited

U.S. PATENT DOCUMENTS

| | | | |
|---|---|---|---|
| 5,380,569 | A | 1/1995 | Kujas et al. |
| 7,673,373 | B2 | 3/2010 | Chang et al. |
| 2008/0093520 | A1 | 4/2008 | Chang et al. |

FOREIGN PATENT DOCUMENTS

| | | |
|---|---|---|
| DE | 4123977 | 1/1993 |
| DE | 102007000905 | 7/2008 |

(Continued)

OTHER PUBLICATIONS

Machine translation of DE202014100448 (Year: 2023).*

(Continued)

*Primary Examiner* — Alexander S Thomas
(74) *Attorney, Agent, or Firm* — Onello & Mello, LLP

(57) ABSTRACT

A patch fitting for a fire-retardant glass door is disclosed herein. The patch fitting comprises a support sandwiched between a first layer of fire retardant material on a first side of the support and a second layer of fire retardant material on an opposing second side of the support. The support comprises a first attachment means for attaching to a first pane of glass of the fire-retardant glass door on the first side of the support, and a second attachment means for attaching to a second pane of glass of the first-retardant glass door on the opposing second side of the support. The patch fitting is configured, in use, to be at least partially sandwiched between the two layers of glass of the firm-retardant glass door.

19 Claims, 5 Drawing Sheets

(51) Int. Cl.
*E05D 11/00* (2006.01)
*E06B 3/02* (2006.01)
*E05D 7/081* (2006.01)

(52) U.S. Cl.
CPC ...... *E05D 2005/0269* (2013.01); *E05D 7/081* (2013.01); *E05Y 2800/416* (2013.01); *E05Y 2900/132* (2013.01)

(56) References Cited

FOREIGN PATENT DOCUMENTS

| | | |
|---|---|---|
| DE | 102010020999 | 11/2011 |
| DE | 202011106509 | 12/2011 |
| DE | 102010032018 | 1/2012 |
| DE | 202014100448 | 5/2015 |
| DE | 202016103533 | 10/2017 |
| EP | 2863001 | 4/2015 |

OTHER PUBLICATIONS

International Search Report and Written Opinion dated Sep. 8, 2020 issued in corresponding International Application No. PCT/GB2020/051356.

Great Britain Examination Report dated Nov. 8, 2021 issued in corresponding Great Britain Application No. 1908739.4.

Great Britain Search Report dated Dec. 4, 2019 issued in corresponding Great Britain Application No. 1908739.4.

* cited by examiner

PATCH FITTING

FIELD OF THE INVENTION

The present disclosure relates to a patch fitting for a glass door, and in particular a patch fitting for a fire-retardant glass door.

BACKGROUND

The walls and inner fire-zone partitions of modern buildings are generally fabricated using materials that are known to impede the spread of fire. However, weak points in the resistance to fire may occur at the locations of apertures in the walls or partitions. For example, fire may take less time to traverse a closed window or door than it would to traverse a solid wall. Accordingly, many jurisdictions have buildings regulations that set out fire performance requirements for newly installed windows, doors, and partitions. In the United Kingdom, doors and windows that are installed in regulated building zones must comply with a given fire resistance as determined in accordance with British Standard 476: part 22: 1987 "Methods for determination of the fire resistance of non-load bearing elements of construction" and/or BS EN 1364-1:2015 "Fire resistance tests for non-loadbearing elements", the whole contents of both of which are hereby incorporated by reference.

British Standard 476 sets out methods for assessing both the integrity and the insulating properties of doors and windows when subjected to fire. Window and door integrity during a fire is important for preventing the direct spread of fire, and the insulating properties of a window or door are important during a fire both for preventing any materials that are adjacent to the door or window from reaching their ignition point, and for sheltering any people that may be behind the door or window. Integrity and insulating performance for a given door or window may be given in terms of a time value, for example, under test conditions a specific door may have met the required integrity criteria for 30 minutes but have only met the required insulating criteria for 20 minutes.

For apertures that are specified to have a translucent or transparent filling, such as windows or glass doors, special glazed materials that have fire retardant properties generally need to be used in order for the door or window to comply with buildings regulations. Example glasses that may be suitable are: Promat® SYSTEMGLAS® F1 glass, POLFLAM® glass and VETROTECH SAINT-GOBAIN® CONTRAFLAM® glass.

SUMMARY OF THE INVENTION

Aspects of the invention are as set out in the independent claims and optional features are set out in the dependent claims. Aspects of the invention may be provided in conjunction with each other and features of one aspect may be applied to other aspects.

According to a first aspect there is provided a patch fitting for a fire-retardant glass door. The patch fitting comprises a support sandwiched between a first layer of fire retardant material on a first side of the support and a second layer of fire retardant material on an opposing second side of the support. The support comprises a first attachment means for attaching to a first pane of glass of the fire-retardant glass door on the first side of the support, and a second attachment means for attaching to a second pane of glass of the first-retardant glass door on the opposing second side of the support. The patch fitting is configured, in use, to be at least partially sandwiched between the two panes of glass of the fire-retardant glass door. For example, at least a portion of the support may be sandwiched between the two panes of glass of the fire-retardant glass door.

The patch fitting may comprise a first receiving portion and a second receiving portion. The patch fitting may be configured to hold a first pane of glass in the first receiving portion with the first attachment means, and to hold a second pane of glass in the second receiving portion with the second attachment means. The first and second receiving portions may be at least partially defined by recesses in at least one of the support and respective first and second fire retardant layers either side of the patch fitting. For example, the first and second receiving portions may be at least partially defined by recesses in the respective first and second fire retardant layers either side of the patch fitting.

An advantage of the patch fitting comprising first and second attachment means is that the glass panes received by the patch fitting are independently supported. In the event of a fire, one of the panes of glass may smash or shatter. However, the other one of the two panes of glass of the fire door may be independently supported by the patch fitting and may retain a secure position in the door even when the shattered pane has become loose and is no longer supported.

The fire retardant material may, for example be a fibre board such as a calcium silicate composite board. The fire-retardant door may comprise two panes of glass sandwiching a fire-retardant material such as a gel or viscous paste, for example a material configured to intumesce and/or undergo an endothermic reaction in the presence of heat greater than a selected threshold corresponding to a fire in proximity to the door.

Optionally, the first and second attachment means are independently operable of each other. This allows the support to individually attach the layers of the patch fitting either side of the support. The first and second attachment means may be coaxial, or may be offset either side of the support from each other.

The support may be generally planar and extend in a plane. The first and second attachment means may be configured to attach to respective panes of glass that extend in planes parallel to, but offset either side of, the plane of the support. The plane of the support may extend in a plane parallel to the respective planes of glass.

The first and second layers of fire-retardant material may optionally also be planar and extend in planes parallel to, but offset from, that of the support and/or the panes of glass. Parallel layers of the support and the fire-retardant layers enable strength to the patch fitting.

Optionally, the first and second layers of fire-retardant material may each have a planar surface area, each configured to cover respective surfaces of the first and second sides of the support. The fire-retardant material may have a generally planar surface area interspersed with depressions and/or holes comprising attachment means and/or defining portions of the fire-retardant layer for receiving respective panes of glass.

The first and second attachment means optionally each extend in a direction transverse to the plane of the support, for example, in a plane orthogonal/perpendicular to the support. In some examples, the first attachment means extends in a direction opposite to a direction the second attachment means extends in. In some examples the first attachment means may extend along the same axis as the second attachment means and in an opposite direction along the axis to the second attachment means.

The patch fitting optionally further comprises a first adhesive layer between the support and the first layer of fire retardant material, and a second adhesive layer adhesive layer between the support and the second layer of fire retardant material. For example, the adhesive may be a fire retardant adhesive.

The first attachment means optionally extends through the first layer of fire retardant material to attach to a pane of glass of the fire-retardant glass door, and the second attachment means also optionally extends through the second layer of fire retardant material to attach to another pane of glass of the fire-retardant glass door.

Optionally, the support and the first and second layers of fire-retardant material can be wrapped in flame retardant coating.

The support may be configured to couple to a hinge for supporting the fire-retardant glass door. For example, the hinge may rotate about an axis that extends in a direction transverse to a direction that both the first and second attachment means extend in. In other examples the hinge rotates about an axis that extends in a direction parallel to the plane of the support.

Optionally, the support comprises a plurality of cut-outs to reduce the mass of material forming the support. The cut-outs may be shaped and/or positioned such that the support comprises material extending between the first and second attachment means and optionally a connection with the hinge.

According to a second aspect there is provided a fire-retardant glass door comprising a patch fitting as described above.

According to a third aspect there is provided a patch fitting insert for a fire-retardant glass door. The patch fitting insert comprises a support sandwiched between a first layer of fire retardant material on a first side of the support and a second layer of fire retardant material on an opposing second side of the support; and a keyhole. The support comprises a first attachment means for attaching to a first pane of glass of the fire-retardant glass door on the first side of the support, and a second attachment means for attaching to a second pane of glass of the first-retardant glass door on the opposing second side of the support. The patch fitting insert is configured, in use, to be at least partially sandwiched between the two panes of glass of the fire-retardant glass door.

DRAWINGS

Embodiments of the disclosure will now be described, by way of example only, with reference to the accompanying drawings, in which.

SPECIFIC DESCRIPTION

Embodiments of the claims relate to a patch fitting for a fire-retardant glass door, the patch fitting configured to securely hold each of the panes of the glass door in isolation of each other. It will be understood that the patch fitting described herein may be combined with other commercially available fire glass systems, such as the Promat® SYSTEMGLAS® F1, which comprises two toughened float glass panes encapsulating an intumescent fire-resistant gel.

Glass fire doors generally comprise two panes of glass separated from each other, typically by an inert gas or transparent material. Conventional patch fittings for glass doors are vulnerable to becoming loose if, for example, one of the panes of glass is smashed or shatters during a fire. This is due to the attachment mechanism, which clamps the two panes together. As a result, if one of the panes shatter, the fitting becomes loose and the remaining pane of glass may no longer be held securely in position by the patch fitting. Embodiments of the disclosure seek to address this vulnerability. In particular, this vulnerability can be isolated by use of a patch fitting 100 as described below, where each pane of glass is individually supported either side of the patch fitting 100 by providing a separate attachment means for each pane of glass on either side of the patch fitting 100.

Figure 1:
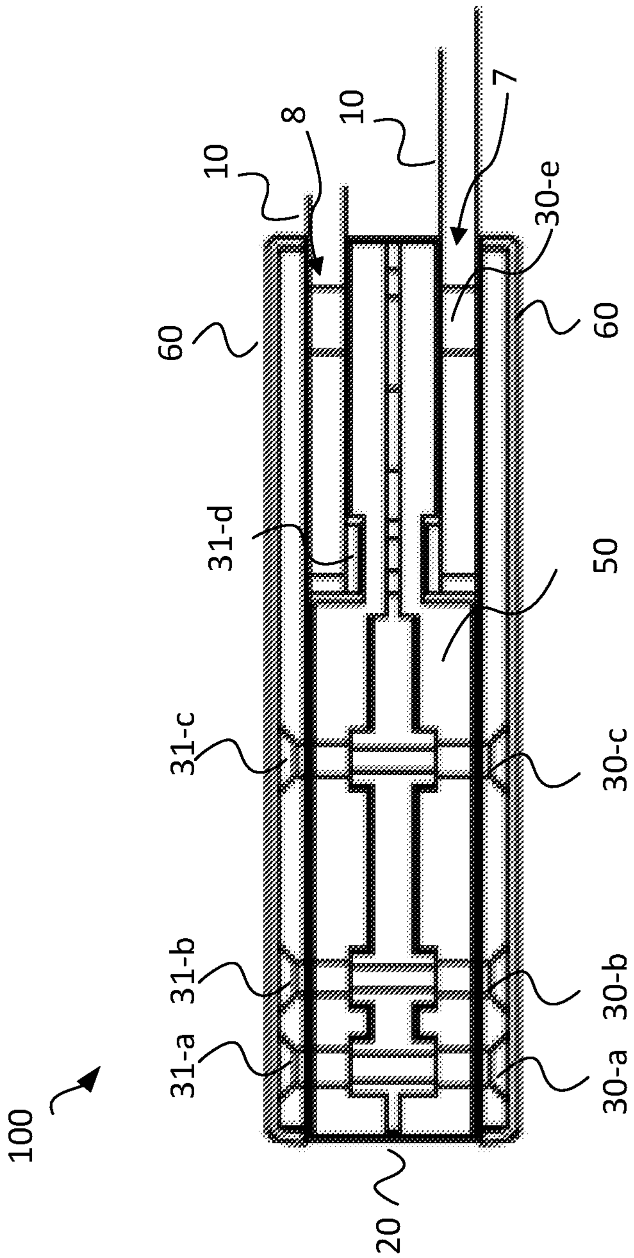
FIG. 1 shows a cross-section of an example patch fitting attached to a fire-retardant door.

FIG. 1 illustrates a cross-section of an example patch fitting 100, as if it were attached to a top corner of a fire-retardant door comprising two panes of glass 10. The patch fitting 100 for a for a fire-retardant glass door shown in FIG. 1 comprises a support 20 sandwiched on either side by fire-retardant layers 50, and further comprising first attachment means 30-*a*, 30-*b*, 30-*c*, 30-*d*, 30-*e*, and second attachment means 31-*a*, 31-*b*, 31-*c*, 31-*d*, 31-*e* for attaching the patch fitting 100 to a fire-retardant door. The patch fitting 100 further comprises fastening plates 60 to go on the outside of each pane of glass 10 to conceal the patch fitting 100 within the door.

As shown in FIG. 1, the support 20 is formed from a relatively thin and planar layer that is positioned at the centre of the patch fitting 100. The support 20 has two sides. The patch fitting 100 comprises a first layer of fire-retardant material 50 (a first fire-retardant layer) adjacent a first side of the support 20, a first pane of glass 10 adjacent to the first fire-retardant layer 50, and a first attachment means 30*a*-*e* that at least partially extends through the first fire-retardant layer 50 from the first side of the support 20. The first fire-retardant layer 50 may be adhered to the first side of the support 20 by a first layer of adhesive, which may be a fire-retardant adhesive.

The patch fitting 100 also comprises a second layer of fire-retardant material (a second fire-retardant layer 50) adjacent the second side of the support 20, a second pane of glass 10 adjacent to the second fire-retardant layer 50, and a second attachment means 31*a*-*e* that at least partially extends through the second fire-retardant layer 50 from the second side of the support 20. The second fire-retardant layer 50 may also be adhered to the second side of the support 20 by a second layer of adhesive, which may be a fire-retardant adhesive.

The support 20 is therefore at least partially sandwiched by the fire-retardant layers 50 and the panes of glass 10. The first and second fire-retardant layers 50 may be a ceramic fibre board, for example made from vermiculite.

In the example shown, the support 20 is relatively thin, in particular in relation to the fire-retardant layers 50, and may be made from metal. It will be understood that in other examples others materials may of course be used, such as carbon fibre. Fastening plates 60 are provided in the example shown on an outer layer of the patch fitting 100.

In the example shown in FIG. 1, the support 20 has a mostly planar geometry comprising first attachment means 30-*a*, 30-*b* and 30-*c* on a first side, and second attachment means 31-*a*, 31-*b* and 31-*c* on a second side.

The first fire-retardant layer 50 has a first thickness and a second thickness which is thinner than the first thickness. The second thickness is different to the first thickness by a thickness of a pane of glass 10 of the fire-retardant door. The two differing thicknesses of the fire-retardant layers 50 may therefore define different portions of the patch fitting 100—for example, the area with the thinner second thickness may define a first pane receiving portion 7 on one side of the patch fitting 100, and a second pane receiving portion 8 on the opposite side of the patch fitting 100, and the area with a greater thickness may define an attaching portion comprising the attachment means 30-*a*, 30-*b*, 30-*c*, 30-*d*, 30-*e*, 31-*a*, 31-*b*, 31-*c*, 31-*d*, 31-*e*, as described in more detail below.

The internal features of the first fire-retardant layer 50, for example on an inner side facing towards and contacting the support 20 on a first side of the support, have a geometry complimentary to that of the support 20, such that the support 20 and fire-retardant layer 50 fit together. The geometry of the inner side of the first fire-retardant layer 50 as shown in the example shown in FIG. 1 comprises a mostly linear face with recesses that align with corresponding protrusions present on the support 20 surrounding each of the first attachment means 30-*a*, 30-*b*, 30-*c*, 30-*d*, 30-*e*. The second fire-retardant layer 50 has an equal but mirrored geometry to the first fire-retardant layer 50 such that is configured to fit with the support 20 on a second side of the support 20.

The first and second attachment means 30-*a*, 30-*b*, 30-*c*, 30-*d*, 30-*e*, 31-*a*, 31-*b*, 31-*c*, 31-*d*, 31-*e* are provided in an equal number of opposing pairs; one of each of the pairs being on either side of the support 20. In the example shown in FIG. 1 there are five opposing hole pairs. The opposing hole pairs are arranged either side of the support 20 such that they are linearly aligned in a direction perpendicular (or transverse) to the length of the support 20, and therefore the first attachment means on one side of the support 20 may be said to be coaxial with the second attachment means on the other side of the support 20. In the example shown the first and second attachment means form different portions of the same threaded hole through the support 20, with the first attachment means being one half of the threaded hole on one side of the support 20, and the second attachment means being the second half of the threaded hole on the other side of the support 20.

In the example shown in FIG. 1 the first and second attachment means 30-*a*, 30-*b*, 30-*c*, 30-*d*, 30-*e*, 31-*a*, 31-*b*, 31-*c*, 31-*d*, 31-*e* comprises five attachment pairs comprising holes 30-*a*, 30-*b*, 30-*c*, 30-*d*, 30-*e*, 31-*a*, 31-*b*, 31-*c*, 31-*d*, 31-*e* on each side of the support 20 which are distributed along at least a portion of the length of the support 20 (however it will be understood that in other examples the first and/or second attachment means may comprise fewer, and in some cases only a single, attachment hole pair). Each of the attachment hole pairs 30-*a*, 30-*b*, 30-*c*, 30-*d*, 30-*e*, 31-*a*, 31-*b*, 31-*c*, 31-*d*, 31-*e* on each side of the support 20 may comprise a raised portion (such as a ring) of increased thickness surrounding the hole relative to the rest of the support 20. The region of increased thickness may serve to increase the depth of the hole in a plane transverse to that of the plane of the support 20, as well as improving the strength of the attachment means in the support 20.

The first and second attachment hole pairs 30-*a*, 31-*a* and 30-*b*, 31-*b* are closely spaced compared to the spacing between the other attachment hole pairs 30-*b*, 31-*b*, 30-*c*, 31-*c*, 30-*d*, 31-*d* and 30-*e*, 31-*e*. The distance between the first and second attachment hole pairs 30-*a*, 31-*a* and 30-*b*, 31-*b* may be, for example, about 16 mm centre-to-centre, whereas the distance between the second and third attachment hole pairs 30-*b*, 31-*b* and 30-*c*, 31-*c* may be about 40 mm centre-to-centre. The first and second attachment hole pairs 30-*a* and 30-*b* are located towards one end of the support 20, whilst the third attachment hole pair 30-*c*, 31-*c* is positioned close a more central location, yet not at the centre, of the support 20. For example the third attachment hole pair 30-*c*, 31-*c* may be positioned about 4/10 of the way along the length of the support 20. The holes that provide the attachment means 30-*a*, 30-*b*, 30-*c*, 30-*d*, 30-*e*, 31-*a*, 31-*b*, 31-*c*, 31-*d*, 31-*e* may have a smallest diameter of less than 7 mm, for example between 6 mm and 6.5 mm, for example 6.4 mm.

In the example shown in FIG. 1, the patch fitting 100 further comprises optional fastening plates 60 on either side of each pane of glass 10 secured by the patch fitting 100 which, in the example shown, span the length of the combined structure of the patch fitting 100, the combined structure comprising the support 20, the fire-retardant material layers 50, the attachment means and the first and second pane receiving portions 7, 8 for receiving the panes of glass 10.

The support 20 comprises a single integrally-formed structure, which for example can be a metallic structure. The support 20 provides a base onto which opposing layers of the patch fitting 100 may be attached, the opposing layers comprising the two fire-retardant material layers 50, the attaching means, and the fastening plates 60. The support 20, at attaching locations defined by the attaching means, may comprise a hollow cylinder in a direction transverse to the plane of the support 20, the plane of the support 20 extending in a direction along the length of the support 20.

The fire-retardant layers 50 may comprise ceramic fibreboard or a suitable fire-retardant material and provide a separation, for example an insulating layer, between the support 20 and each of the glass panes 10. The fire-retardant layers 50 also comprise a plurality of holes. The holes align with corresponding holes in the support 20 and the fastening plates 60 to form the attachment means 30-*a*, 30-*b*, 30-*c*, 30-*d*, 30-*e*, 31-*a*, 31-*b*, 31-*c*, 314*d*, 31-*e*.

A size of the patch fitting 100, as assembled with all the layers and as defined by the fastening plates which provide the outermost layers, may be about 150 mm along the length, for example along the longest dimension, and about 50 mm in height and depth. The length may be less than 200 mm, preferably between 150 mm and 175 mm, more preferably around 165 mm. The height (distance which the patch fitting 100 extends along and in the plane of the door) may be less than 60 mm, for example between 45 and 55 mm, more preferably 52 mm. The depth, which may be dependent on a thickness of the glass panes 10, may be less than 60 mm, for example between 40 mm and 50 mm, more preferably 46 mm.

The layers of the patch fitting 100 or any component thereof, may be manufactured by subtractive or additive processes. For example, the support 20 may be manufactured using 3D printing using a PLA thermoplastic material. The fire-retardant layers 50 comprising fire-retardant material may be manufactured using subtractive processes. Some of the parts of the assembly, or of the fire door to which the fitting if fit might be widely available or standard parts, such as the fastening plate 60, the glass 10 and door frame and any screws that might be used for attachment.

The support 20 provides a base for supporting the panes of glass 10 of a fire-retardant glass door in isolation of each other. The glass panes 10 can be individually attached to either side of the support 20 by the separate first and second attachment means 30-*a*, 30-*b*, 30-*c*, 30-*d*, 30-*e*, 31-*a*, 31-*b*, 31-*c*, 31-*d*, 31-*e* either side of the support 20. The separate first and second attachment means 30-*a*, 30-*b*, 30-*c*, 30-*d*, 30-*e*, 31-*a*, 31-*b*, 31-*c*, 31-*d*, 31-*e* either side of the support 20 may therefore be independently operable of one another.

The fire-retardant material 50 layers either side of the support 20 are arranged to provide a passage for receiving the first and second attachment means 30*a*-*c* and 31*a*-*c*. A first glass pane 10 is arranged to be attached by the first attachment means 30-*a* to 30-*e* to a first side of the support 20 and a second glass pane 10 is arranged to be attached by the second attachment means 31-*a* to 31-*e* to a second side of the support 20.

As noted above, the support 20 and the fire-retardant layers 50 define an attaching portion of the patch fitting 100 and respective first and second pane receiving portions 7, 8 of the patch fitting 100. In particular, the first and second fire-retardant layers 50 comprise recesses (in the example shown regions of reduced thickness, wherein the reduction in thickness corresponds to the thickness of a pane of glass 10 to be received by the first and second pane receiving portions 7, 8)) that define the first and second pane receiving portions 7, 8. In the example shown the support 20 also comprises a region of reduced thickness that also defines the first and second pane receiving portions 7, 8. The reduction in thickness of the support 20 in this region means that the support can still be sandwiched by two layers of fire-retardant material 50 even in the region defining the first and second pane receiving portions 7, 8 without making the patch fitting 100 thick and/or without requiring an excessive spacing between the two panes of glass 10 of the fire-retardant glass door.

The first and second pane receiving portions 7, 8 are each configured to receive respective panes of glass 10. The attaching portion is arranged to attach the layers of the patch fitting 100 securely to each other and comprises the portion of the patch fitting 100 having the attachment means 30-*a*, 30-*b*, 30-*c*, 30-*d*, 30-*e*, 31-*a*, 31-*b*, 31-*c*, 31-*d*, 31-*e*. The attaching portion is also arranged to secure the respective panes of glass 10 of a fire-retardant glass door inside each corresponding pane receiving portion 7, 8 of the patch fitting 100.

The first and second pane receiving portions 7, 8 comprise apertures or cavities, for receiving first and second panes of glass 10 spaced apart from each other by the fire-retardant material layers 50 and the support 20. The first and second pane receiving portions 7, 8 are configured to receive the glass panes 10 and are separate from the attaching portion, where the attaching portion provides strength to the patch fitting 100 for fastening the patch fitting 100 to a fire-retardant glass door. The attachment means 30-*a*, 30-*b*, 30-*c*, 30-*d*, 30-*e*, 31-*a*, 31-*b*, 31-*c*, 31-*d*, 31-*e* either side of the support 20 are positioned so as to minimise the rotational freedom of the fitting 100 at the end of the fitting arranged to receive the glass panes 10 (i.e. the pane receiving portions 7, 8). The position, and close proximity, of attachment hole pairs 30-*a*, 31-*a* and 30-*b*, 31-*b* may act to prevent rotation of the opposing end in a plane transverse to the plane of the fire-retardant door and the glass panes 10, which is strengthened by the third attachment hole pair at 30-*c*, 31-*c*.

The attachment means 30-*a*, 30-*b*, 30-*c*, 30-*d*, 30-*e*, 31-*a*, 31-*b*, 31-*c*, 31-*d*, 31-*e* either side of the support 20 comprise means for attaching the patch fitting 100 to a fire-retardant door. The attachment means 30-*a*, 30-*b*, 30-*c*, 30-*d*, 30-*e*, 31-*a*, 31-*b*, 31-*c*, 31-*d*, 31-*e* are arranged to pass through the layers of the patch fitting 100 from the outside of the fitting (and outside of the panes of glass to which the patch fitting 100 is secured) to the support 20 and on either side of the support 20. In this way, the first attachment means 30-*a*, 30-*b*, 30-*c*, 30-*d* and 30-*e* on one side of the support 20 are configured to hold a first pane of glass 10 in the first pane receiving portion 7 of the patch fitting 100 independently of the second attachment means 31-*a*, 31-*b*, 31-*c*, 31-*d*, 31-*e* holding a second pane of glass 10 in the second pane receiving portion 8 of the patch fitting 100 on the opposite side of the support 20.

In the example shown in FIG. 1, the attachment means 30-*a* to 30-*e*, 31-*a* to 31-*e* comprise an aperture or cavity arranged to receive a fastening means, for example a detachable fastening means such as a screw or threaded bolt. A first fastening means is arranged to attach an optional first fastening plate 60 and a first fire-retardant layer 50 comprising the first pane receiving portion 7 for receiving a first pane of glass 10 to one side of the support 20. A second, opposing fastening means is arranged to attach an optional second fastening plate 60 and a second fire retardant layer 50 comprising the second pane receiving portion 8 for receiving a second plane of glass 10 to the other, opposite side of the support 20. The fastening means are arranged to attach to the support 20 at attaching locations, which are present on the support 20 at points of greatest thickness; as illustrated in FIG. 1 by the orthogonal intersections of the support 20 with the attachment means 30-*a* to 30-*e* and 31-*a* to 31-*e*. Although the example shown in FIG. 1 is described with reference to an attachment means comprising detachable fastening means, it will be understood that the attachment means may take other forms suitable for fastening each pane of glass 10 independently to the support 20.

An optional first fastening plate 60 is arranged to provide a clamp that maintains the position of the layers of the patch fitting 100 between the fastening plate 60 and the support 20 on a first side of the support 20. An optional second fastening plate 60 is arranged to provide the same function as the first fastening plate 60 but clamps the layers to a second side of the support 20. The first and second fastening plates 60 may be configured to clamp first and second panes of glass in the respective first and second pane receiving portions 7, 8 of the patch fitting 100. It will be understood that the optional first and second fastening plates 60 may also act to conceal the patch fitting 100 inside the glass door and therefore may serve an aesthetic function, although it will also be understood that in some examples the patch fitting 100 may also comprise respective cover plates to cover the corresponding first and second fastening plates 60. It will also be understood that the attachment means 30-*a*, 30-*b*, 30-*c*, 30-*d*, 30-*e*, 31-*a*, 31-*b*, 31-*c* 31-*d*, 31-*e* may act to secure the patch fitting 100 to the glass door, and thus each pane of glass 10 independently to the support 20, without the need for the fastening plates 60.

Fastening plates 60 may also form part of the attachment means, 30-*a*, 30-*b*, 30-*c*, 30-*d*, 30-*e*, 31-*a*, 31-*b*, 31-*c* 31-*d*, 31-*e* for example by having holes in positions aligned with those of the layers it is clamping such that a fastening mechanism, for example a screw, can lay flush with the layers of the patch fitting 100 and provide a secure fastening. In some examples there may also be an optional cover plate adapted to clip onto each of the fastening plates 60 to conceal the fastening mechanism.

In the example shown each attachment means pair 30*a*-31*a*, 30*b*-31*b*, 30*c*-31*c*, 30*d*-31*d*, 30*e*-31*e* on the support 20 comprises a single hollow cylinder/receiving cavity that extends through the support 20 either side of the support 20. However, it will be understood that in other examples the attachment means 30-*a*, 30-*b*, 30-*c*, 30-*d*, 30-*e*, 31-*a*, 31-*b*, 31-*c*, 31-*d*, 31-*e* may extend from each side of the support 20 such that separate receiving cavities are created either side of the support 20.

In examples where the fastening means comprises a screw, the attaching locations and the holes through the fire-retardant layers 50 may comprise a screw thread so as to attach and secure the screw to the support 20.

An important feature of the patch fitting 100 is that it is fire-retardant. The fire-retardant door to which the patch fitting 100 is configured to attach to may generally comprise two panes of glass 10 sandwiching a transparent fire-retardant material such as a gel or viscous paste, for example a material configured to intumesce and/or undergo an endothermic reaction in the presence of heat greater than a selected threshold (such as equal to or greater than 110 degrees centigrade) corresponding to a fire in proximity to the door. The fire-retardant material sandwiched between the panes of glass 10 may be different to the fire retardant material forming the fire-retardant layers 50 of the patch fitting 100, which may, for example be a ceramic fibre board. The support 20 and the first and second layers of fire-retardant material 50 can also be wrapped in a flame retardant coating.

The patch fitting 100 acts to provide a secure fitting for a fire-retardant door comprising two panes of glass 10. In the event of a fire, one of the panes of glass 10 may break or shatter/smash (typically the pane of glass 10 closest to the fire). The patch fitting 100 attaches the panes of glass 10 separately to the support 20 (by virtue of attachment hole pairs 30-*a*, 30-*b*, 30-*c*, 30-*d*, 30-*e*, 31-*a*, 31-*b*, 31-*c*, 31-*d*, 31-*e* either side of the support 20 which are individually operable) to individually attach the two glass panes 10 to each side of the support 20. If one of the panes 10 becomes loose (for example because it has shattered due to a fire in close proximity), the other pane of glass 10 may remain securely attached to the support 20. This can help to extend the time with which the patch fitting 100, and the fire-retardant door to which the patch fitting 100 is attached, can endure the conditions of a fire and prevent the fire spreading compared to prior art patch fittings.

A fire-retardant door may comprise one or more patch fittings 100, for example two or four patch fittings 100. A first patch fitting 100 attaches in a top corner of the door on a side of the door that rotates about a hinge, for example the side of the door (when looking at the plane of the door) that displaces minimally compared to the other side of the door when the door is opened and closed. A second patch fitting 100 attaches in a bottom corner of the door on the same side of the door as the first patch fitting 100.

The fire-retardant door to which the patch fitting 100 is attached comprises two panes of glass sandwiching therebetween a fire-retardant material such as a gel or viscous paste, for example a material configured to undergo an endothermic reaction in the presence of heat greater than a selected threshold corresponding to a fire in proximity to the door.

Figure 2:
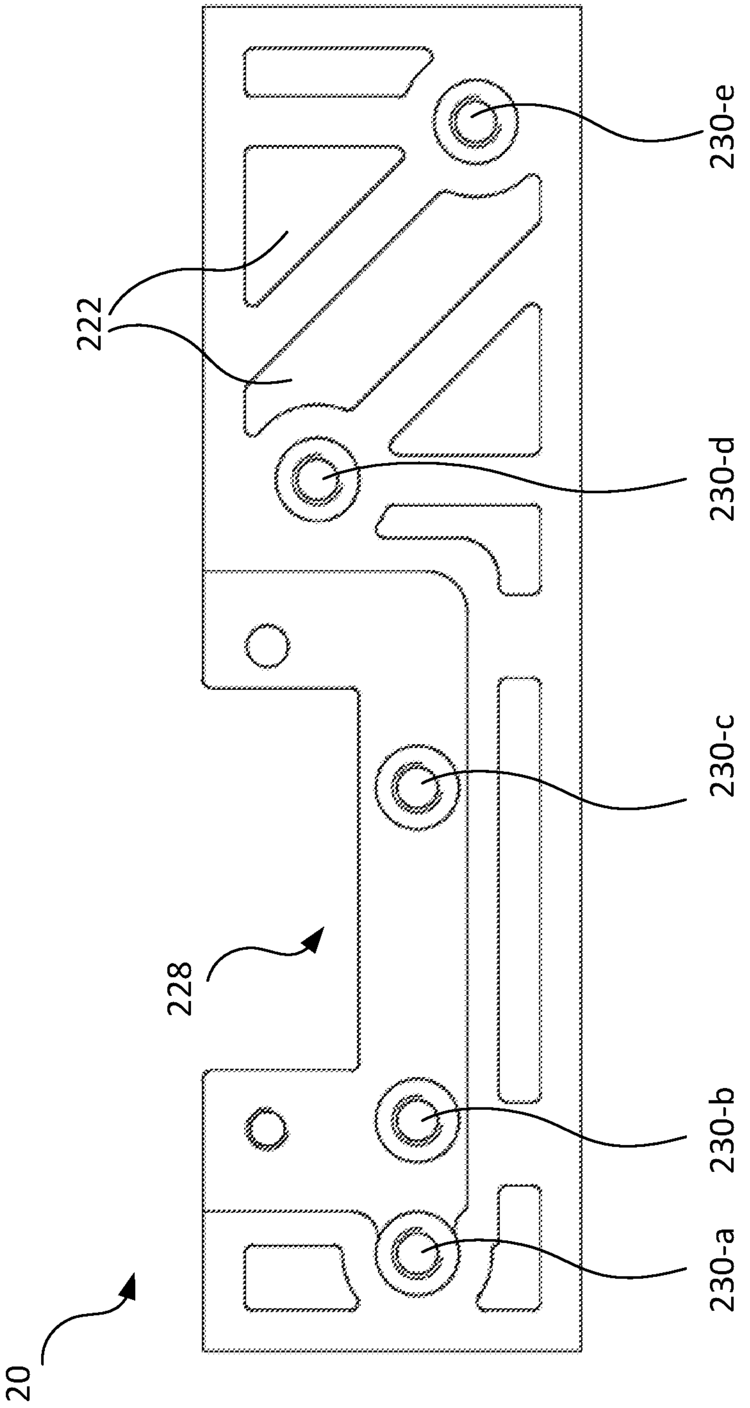
FIG. 2 shows a support layer for a patch fitting such as the example patch fitting shown in FIG. 1.

FIG. 2 illustrates the support 20 from a side-view, parallel to the plane in which the fire-retardant glass door extends. As such, FIG. 2 illustrates one face of the support 20 on one side of the support 20. It will be understood that the other face of the support 20 on the other side of the support 20 may be a mirror image of that shown in FIG. 2. In the example shown in FIG. 2, the support 20 is substantially rectangular in shape and comprises a series of cut-outs 222, holes 230-*a*, 230-*b*, 230-*c*, 230-*d* and 230-*e*, and a recess 228.

The support 20 comprises regions of varying thickness, for example different widths/depths, along its length, wherein the length is a largest dimension of the support 20. The thickness (taken in direction perpendicular to the plane of the support 20) of the support 20 has a first thickness at an end distal to the pane receiving portions 7, 8 of the patch fitting 100. The remainder of the support 20 has a second thickness, which is thicker than the first thickness, although as will be described below the support may have a third thickness which is thicker than the second thickness in a region proximate to, for example surrounding, each of the attachments means 230*a-e*.

The holes 230-*a* to 230-*e* correspond to the first attachment means as described above on one side of the support 20 (and it will be understood that the other side of the support 20 will have corresponding holes corresponding to the second attachment means). It can be seen from the example shown in FIG. 2 that three of the (the first three) attachment means 230*a-c* are arranged linearly.

In some examples the patch fitting 100 may comprise attachment means each configured to pass through respective panes 10 of the glass of the fire-retardant glass door. For example, the first pane receiving portion 7 may comprise at least one attachment means configured to pass through a pane of glass 10 held in the first pane receiving portion 7, and the second pane receiving portion 8 may comprise at least one attachment means configured to pass through another pane of glass 10 held in the second pane receiving portion 8.

Figure 3:
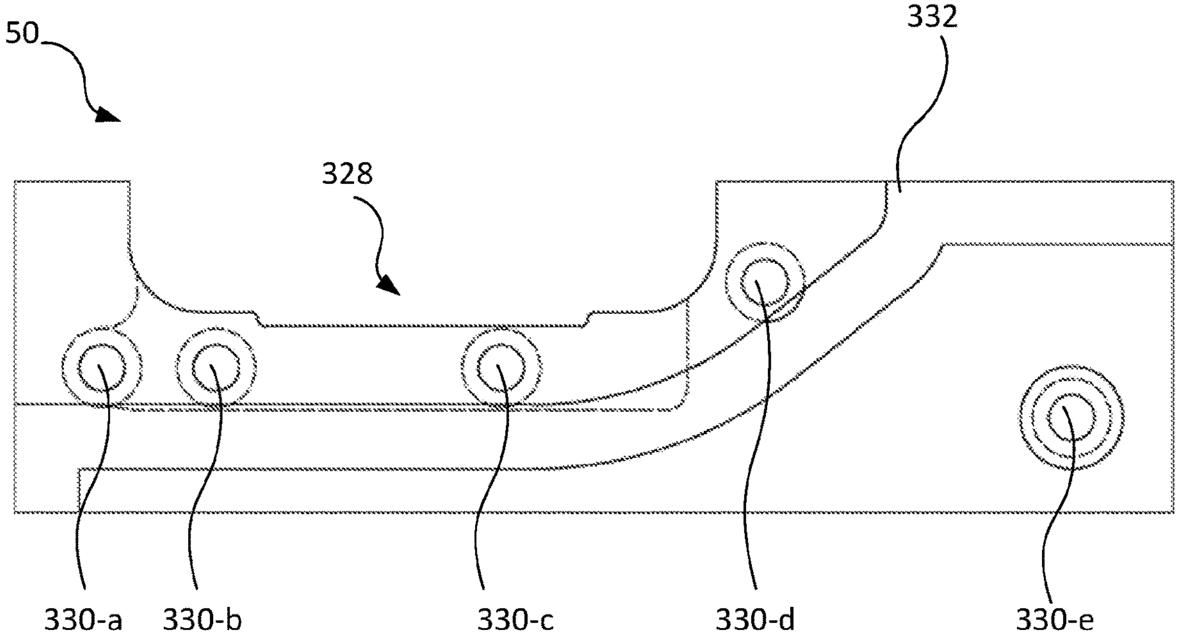
FIG. 3 shows a fire-retardant layer for a patch fitting such as the patch fitting shown in FIG. 1.
Figure 4:
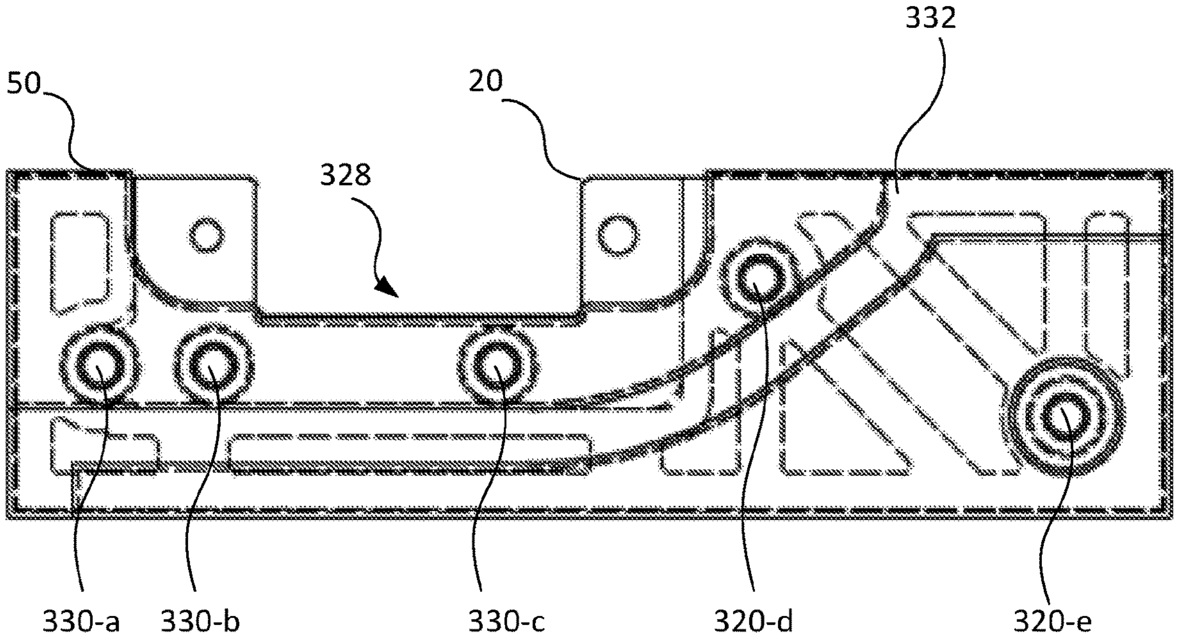
FIG. 4 shows a support layer and a fire-retardant layer fitted together for a patch fitting such as the patch fitting shown in FIG. 1.

In the example shown in FIGS. 2, 3 and 4, two of the attachment means, for example threaded holes 230-*d*, 230-*e* are configured to receive fastening means that pass through a pane of glass 10 held in the first pane receiving portion 7 and the second pane receiving portion 8 respectively. It will be understood that the support may comprise first additional attachment means (optionally comprising a plurality a plurality of attachment means) on one side of the support 20, and second additional attachment means (optionally comprising a plurality of attachment means) on the other side of the support 20.

One of the (in the example shown, the fourth) holes 230-*d* is offset from (positioned slightly above) a line intersecting the first three holes 230-*a* to 230-*c*, whilst another one of the (in the example shown, the fifth) holes 230-*e* is also offset from (positioned slightly below) this line by the same amount. The attachment means 230*a*-230*e* are configured to hold a first glass pane 10 on one side of the patch fitting 100 in the first pane receiving portion 7, and corresponding attachment means (not shown) on the other side of the support 20 are configured to hold a second glass pane 10 on the other side of the patch fitting 100 in the second pane receiving portion 8.

The attachment means 230*a*-230*e* may also be configured to hold the first fire-retardant layer 50 to the support 20 using, for example a fastening means such as a screw or bolt inserted into the threaded holes 230*a*-230*e*, and corresponding attachment means on the other side of the support 20 may also be configured to hold the second fire-retardant layer 50 to the support 20. In the example shown two of the threaded holes 230-*d*, 230-*e* (i.e. in the example shown, the threaded holes in the corresponding first pane receiving portion 7) may be positioned so as to align with corresponding holes in the first glass pane 10 (with the threaded holes in the corresponding second pane receiving portion 8 being positioned so as to align with corresponding holes in the second glass pane 10).

As shown in more detail in FIG. 8 and as described below, a hinge recess 228 in the support 20 allows for a fitting to be made with the external frame of the fire-retardant door, wherein the fitting acts as a hinge of the door. The support 20 of the patch fitting 100 may be configured to couple to a hinge for supporting the fire-retardant glass door. The hinge in this example rotates about an axis that extends in a direction transverse to a direction that both the first and second attachment means extend in. For example, the hinge might rotate about an axis that extends in a direction parallel to a plane of the support.

The support 20 comprises a plurality of cut-outs to reduce the mass of material forming the support. The cut-outs are shaped and/or positioned such that the support 20 comprises material extending between the first and second attachment means (30*a*-*e* and 31*a*-*e* of FIG. 1) and a connection with a hinge. The cut-out portions, for example as illustrated by 222, are distributed across the support 20. Their geometry is dependent on the features of the support 20 that they are adjacent to. Cut-outs 222, or rather the parts of the support 20 not cut-out, together provide a lightweight frame of the support 20. By removing unnecessary bulk from the support structure, the weight of the support 20, and ultimately the weight of the patch fitting 100 as a whole, can be minimised.

The support 20 may be glazed within the glass at the corners of the glass where the patch fitting 100 will be positioned.

FIGS. 3 and 4 illustrate the fire-retardant layer 50 from a side-view, parallel to the plane in which the fire-retardant glass door extends and parallel to the plane of the support 20. The features of the support 20 that would not be visible from this view are represented by dashed lines.

The fire-retardant layer 50 comprises a series of holes 330-*a* to 330-*e* configured to line up with the corresponding holes 230-*a* to 230-*e* of the support 20. Fastening means can be arranged to attach the fire-retardant layer 50 to the support 20 via these holes. It will be understood that the fastening means together with the holes 230-*a* to 230-*e* of the support 20 may provide attachment means for securing panes of glass 10 to the patch fitting 100.

Four of the holes 330-*a*, 330-*b*, 330-*c* and 330-*d* are arranged above a depression 332, whilst a fifth hole 330-*e* is arranged below the depression 332. The depression 332 protrudes from the fire-retardant layer 50 (in a direction out of the plane of the support 20). A glass pane 10 is received in the portion below the depression 332 and is separated from the attachment means 330-*a*, 330-*b*, 330-*c* and 330-*d* by the depression 332. The thickness, or depth, of the fire-retardant layer 50 may be different above and below the depression 332, where the depression has the smallest depth. The portion to one side of, for example below, a depression in a face of the fire-retardant layer 50 may be thinner, for example, to define one of the first and second pane receiving portions 7, 8 and thereby accommodate the pane of glass 10 to be received in use. A portion of a face of the fire-retardant layer 50 such as around the holes 330-*a*, 330-*b*, 330-*c*, 330-*d* and 330-*e*, however, may have a greater thickness, for example for improved strength around a fastening means passing through the holes 330-*a*, 330-*b*, 330-*c*, 330-*d* and 330-*e* for coupling with the attachment means 230-*a* to 230-*e* of the support 20. In the example shown there is a ring of material of increased thickness surrounding each hole 330-*a*, 330-*b*, 330-*c*, 330-*d* and 330-*e*, through each of the fire-retardant layers 50. It will be understood that in such regions the panes of glass 10 may comprise corresponding recesses for receiving these regions of increased depth of the fire-retardant layers 50 that support each of the holes 330-*a*, 330-*b*, 330-*c*, 330-*d* and 330-*e*.

The hinge recess 328 of the fire-retardant layer 50 is slightly wider than that of hinge recess 228 of the support 20 for receiving a pivot fitting 800 (as will be described in more detail below with reference to FIG. 8), such that the support 20 can be seen through part of the recess 328 in the fire-retardant layer 50 when the layers are fitted together. It can be seen from FIG. 3 that the support 20 fits with the fire-retardant layer 50 by having a first surface that contacts the surface of the support 20 with a complimentary geometry to the support surface. A second surface of the fire-retardant layer 50 faces away from the support 20 and is arranged with a depression 332 that extends the length of the fire-retardant layer on the second side. One fire-retardant layer is positioned on either side of the support 20 with the first surface of each of the fire-retardant layers configured to face and contact the support 20. The surface profile of both the first and second surfaces of the layers is mirrored about the support 20.

Figure 5:
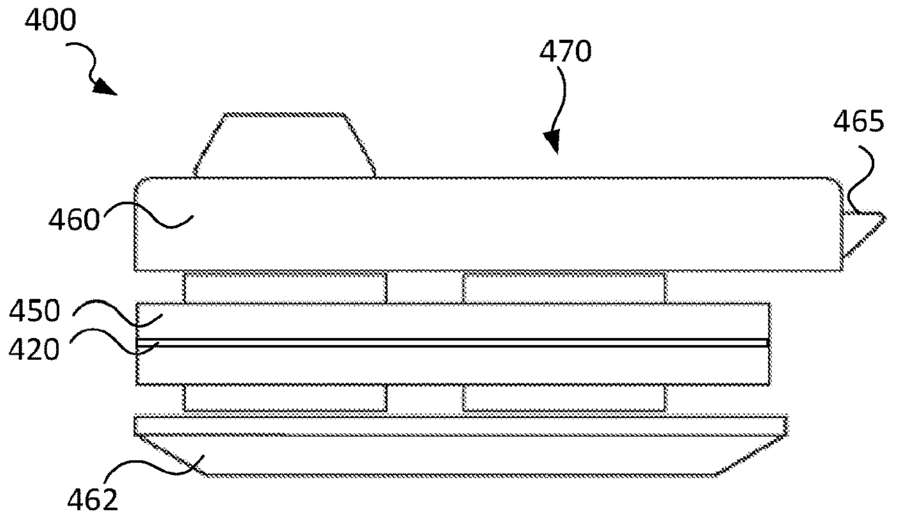
FIG. 5 shows a cross-section of an example patch fitting insert.

FIG. 5 shows a cross-section of an example patch fitting insert 400. The patch fitting insert 400 is arranged to provide a fire-retardant lock for a fire-retardant glass door. The patch fitting insert 400 has a similar construction to the patch fitting 100 as described above, with additional features for a user to be able to lock the door, for example a keyhole 470 for inserting a key and unlocking the lock and a locking mechanism 465.

The patch fitting insert 400 shown in FIG. 5 comprises a support 420, fire-retardant layers 450, attachment means 430, a keyhole 470 for receiving a key for operating a locking mechanism 465, a top plate 460 optionally comprising the locking mechanism 465, and a back plate 462. However, it will be understood that in some examples the locking mechanism 465 may be provided as part of and/or coupled to the support 420.

The support 420 is sandwiched between a first and a second fire-retardant layer 450. One a first side, the first fire-retardant layer 450 is configured to attach to a top plate 460 comprising a locking mechanism 465. On a second side, the second fire-retardant layer 450 is configured to attach to a back plate 462. A clearance hole 430 extends through the top plate 460, the first fire-retardant layer 450, support 420, second fire-retardant layer and back plate 462, and provides clearance for a spindle for a lever handle configured to operate the locking mechanism 465 to rotate within.

The internal features of the fire-retardant layer 450, for example on an inner side facing towards and contacting the support 420, have a geometry complimentary to that of the support 420, such that the support 420 and fire-retardant layer 450 fit together. The attachment means 430 are provided in opposing pairs; one of each of the pairs being on either side of the support 420 at a point on the length of the support such that they are linearly aligned in a direction perpendicular (or transverse) to the length of the support.

A top plate 460 and a back plate 462 sandwich the layers of the support 420 and the fire-retardant layers 450. A top plate 460 is arranged with a locking mechanism 465 which may interact with a lock on the doorframe to which the fire-retardant glass door is attached or with another door.

The patch fitting insert 400 is arranged to be fitted to a fire-retardant glass door.

Figure 6:
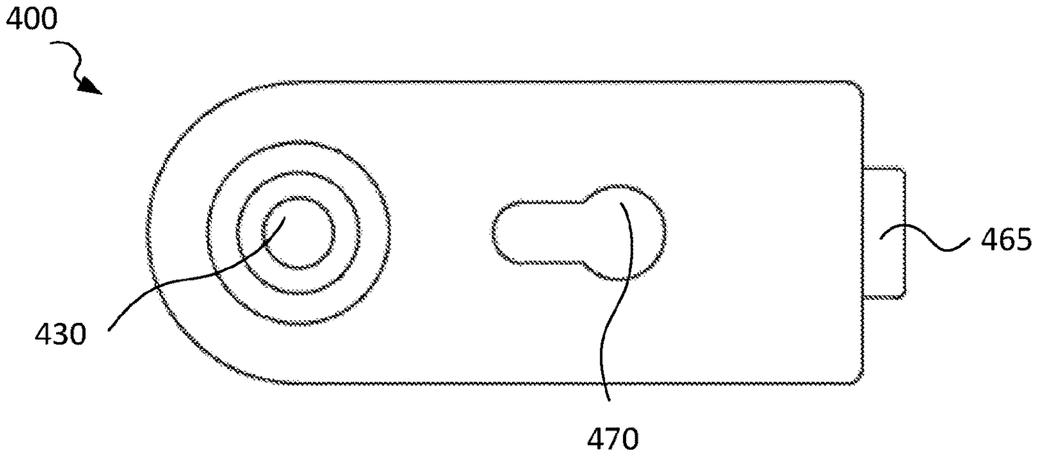
FIG. 6 shows a patch fitting insert, such as the patch fitting insert of FIG. 5, attached to a fire-retardant door.

FIG. 6 shows a patch fitting insert 400, such as the patch fitting insert of FIG. 5, attached to a fire-retardant door. The visible features of the patch fitting insert 400 when fitted on a fire-retardant door are the top plate (when viewed from the front as shown in FIG. 6) comprising the attachment means 430 and the keyhole 470.

Figure 7:
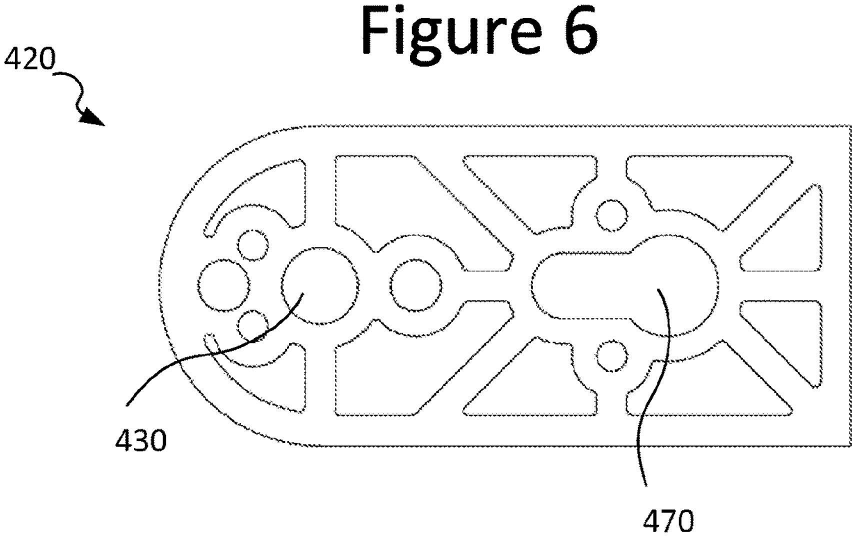
FIG. 7 shows a support for a patch fitting insert such as the patch fitting insert of FIG. 5.

FIG. 7 shows a support 420 for a patch fitting insert such as the patch fitting insert 400 of FIG. 5. The support 420 comprises a plurality of cut-outs to reduce the mass of material forming the support. The cut-outs are shaped and/or positioned such that the support 420 comprises material extending between the attachment means 430 and the keyhole 470.

Figure 8:
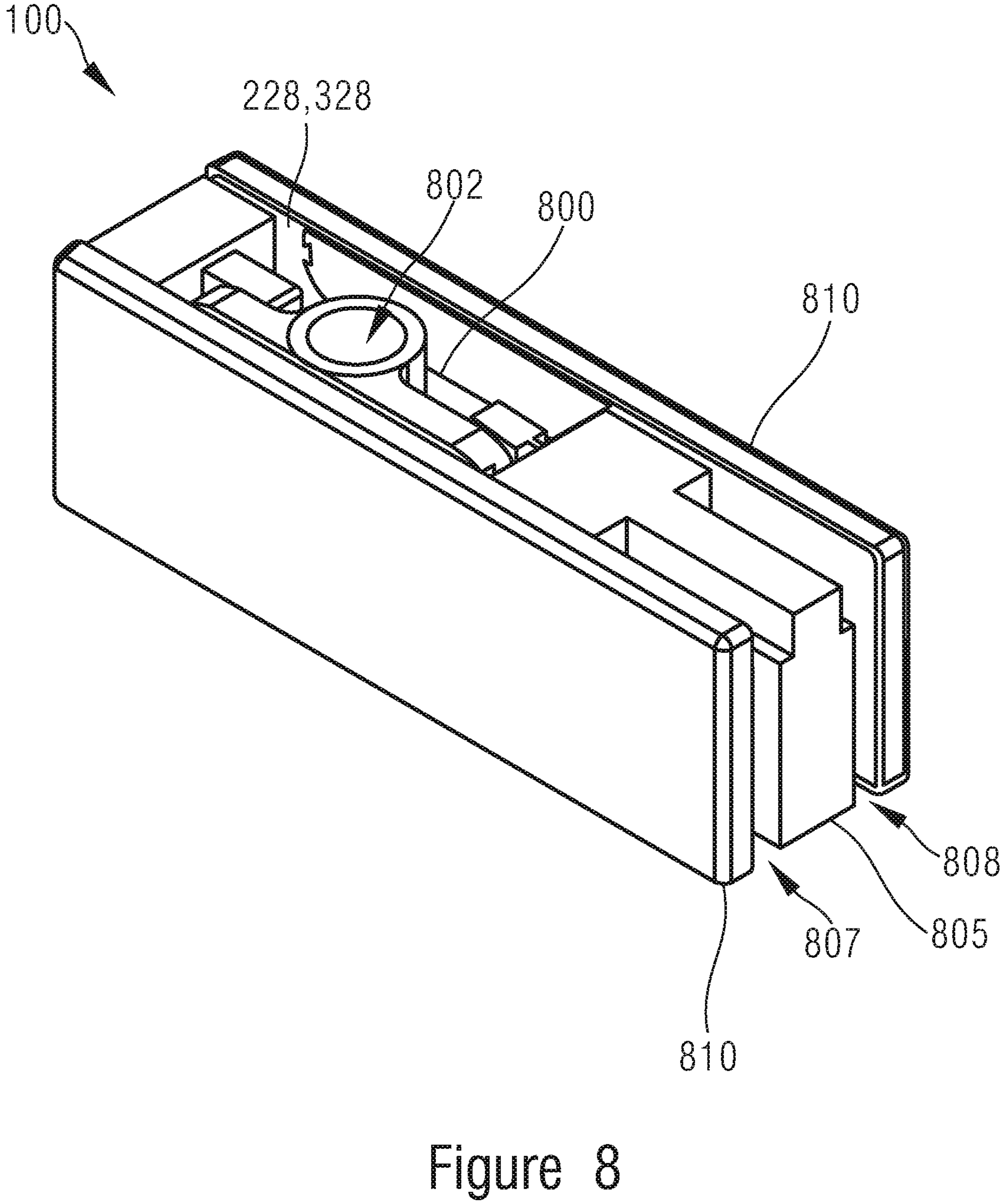
FIG. 8 shows a perspective view of an example patch fitting, such as the patch fitting shown in FIG. 1.

FIG. 8 shows a perspective view of an example patch fitting, such as the patch fitting 100 shown in FIG. 1. The patch fitting 100 comprise a pivot fitting 800 received by the hinge recess 328 of the fire-retardant layers 50 and the hinge recess 228 of the support 20. In the example shown the fire-retardant layers 50 and the support 20 are wrapped in a flame retardant coating forming a wrapped insert 805. The pivot fitting 800 has a receiving portion 802 having a rotational axis configured to mate with a corresponding projection projecting from a hinge fitting on a doorframe for the patch fitting 100 (and thereby the fire-retardant glass door) to pivot about the rotational axis. The wrapped insert 805 has first and second pane receiving portions 807, 808 either side of the wrapped insert 805 and either side of the rotational axis of the pivot fitting. In the example shown, the first and second pane receiving portions 807, 808 are defined by recesses in the wrapped insert 805 on opposing side of the wrapped insert 805. Each pane receiving portion 807, 808 is configured to receive a corresponding respective pane of glass 10. The patch fitting 100 shown in FIG. 8 also comprises fastening plates 60 (hidden) either side of the wrapped insert 805, with respective cover plates 810 covering each of the fastening plates 60.

The patch fitting 100, patch fitting insert 400, or any component thereof, may also be manufactured by assembling pre-manufactured components together such as by adhering a sheetlike element to a substrate. This may be done by laying down a preformed track of the material, or by laying down a larger sheet and then etching it away. This sheetlike element may be grown or deposited as a layer on the substrate. If it is deposited a mask may be used so the deposition happens only on regions which are to carry the track and/or it may be allowed to take place over a larger area and then selectively etched away.

The components of the patch fitting and/or the patch fitting insert 400, such as the support 20, may be made by subtractive manufacturing, for example extrusion or laser cutting, however, other methods of manufacture may also be used. For example, the support 20 may be manufactured by way of '3D printing' whereby a three-dimensional model of the support 20 are supplied, in machine readable form, to a '3D printer' adapted to manufacture the support 20. This may be by additive means such as extrusion deposition, Electron Beam Freeform Fabrication (EBF), granular materials binding, lamination, photopolymerization, or stereolithography or a combination thereof. The machine readable model comprises a spatial map of the object to be printed, typically in the form of a Cartesian coordinate system defining the object's surfaces. This spatial map may comprise a computer file which may be provided in any one of a number of file conventions. One example of a file convention is a STL (STereoLithography) file which may be in the form of ASCII (American Standard Code for Information Interchange) or binary and specifies areas by way of triangulated surfaces with defined normals and vertices. An alternative file format is AMF (Additive Manufacturing File) which provides the facility to specify the material and texture of each surface as well as allowing for curved triangulated surfaces. The mapping of the support 20 may then be converted into instructions to be executed by 3D printer according to the printing method being used. This may comprise splitting the model into slices (for example, each slice corresponding to an x-y plane, with successive layers building the z dimension) and encoding each slice into a series of instructions. The instructions sent to the 3D printer may comprise Numerical Control (NC) or Computer NC (CNC) instructions, preferably in the form of G-code (also called RS-274), which comprises a series of instructions regarding how the 3D printer should act. The instructions vary depending on the type of 3D printer being used, but in the example of a moving printhead the instructions include: how the printhead should move, when/where to deposit material, the type of material to be deposited, and the flow rate of the deposited material.

It will be appreciated from the discussion above that the embodiments shown in the Figures are merely exemplary, and include features which may be generalised, removed or replaced as described herein and as set out in the claims.

In the context of the present disclosure other examples and variations of the apparatus and methods described herein will be apparent to a person of skill in the art.

The invention claimed is:

1. A patch fitting for a fire-retardant glass door, the patch fitting comprising:
- a support sandwiched between a first layer of fire-retardant material on a first side of the support and a second layer of fire-retardant material on an opposing second side of the support;
- wherein the support comprises:
  - a first attachment means for attaching to a first pane of glass of the fire-retardant glass door on the first side of the support; and
  - a second attachment means for attaching to a second pane of glass of the first-retardant glass door on the opposing second side of the support;
  - such that the patch fitting is configured, in use, to be at least partially sandwiched between the two panes of glass of the fire-retardant glass door,
  - wherein the support is configured to couple to a hinge for supporting the fire-retardant glass door.

2. The patch fitting of claim 1 wherein the first and second attachment means are independently operable of each other.

3. The patch fitting of claim 1 wherein the patch fitting comprises a first receiving portion and a second receiving portion, and wherein the patch fitting is configured to hold a first pane of glass in the first receiving portion with the first attachment means, and to hold a second pane of glass in the second receiving portion with the second attachment means.

4. The patch fitting of claim 3 wherein the first and second receiving portions are at least partially defined by recesses in at least one of (i) the support and (ii) respective first and second fire-retardant layers either side of the patch fitting.

5. The patch fitting of claim 1 wherein the support is generally planar and extends in a plane; and
- wherein the first and second attachment means are configured to attach to respective panes of glass that extend in planes parallel to, but offset either side of, the plane of the support.

6. The patch fitting of claim 5 wherein the first and second layers of fire-retardant material are also planar and extend in planes parallel to, but offset from, that of the support.

7. The patch fitting of claim 6 wherein the first and second layers of fire-retardant material have a planar surface area each configured to cover respective surfaces of the first and second sides of the support.

8. The patch fitting of claim 5 wherein the first and second attachment means each extend in a direction transverse to the plane of the support.

9. The patch fitting of claim 1 wherein the first attachment means extends in a direction opposite to a direction the second attachment means extends in.

10. The patch fitting of claim 1 further comprising a first adhesive layer between the support and the first layer of fire-retardant material, and a second adhesive layer adhesive layer between the support and the second layer of fire-retardant material.

11. The patch fitting of claim 1 wherein the first attachment means extends through the first layer of fire-retardant material to attach to a pane of glass of the fire-retardant glass door, and wherein the second attachment means extends through the second layer of fire retardant material to attach to another pane of glass of the fire-retardant glass door.

12. The patch fitting of claim 1 wherein the support and the first and second layers of fire-retardant material are wrapped in flame retardant coating.

13. The patch fitting of claim 1 wherein the support is configured to couple to a hinge that rotates about an axis that extends in a direction transverse to a direction that both the first and second attachment means extend in.

14. The patch fitting of claim 1, wherein the first and second layers of fire-retardant material are also planar and extend in planes parallel to, but offset from, that of the support, the support is configured to couple to a hinge for supporting the fire-retardant glass door, and the support is configured to couple to a hinge that rotates about an axis that extends in a direction parallel to the plane of the support.

15. The patch fitting of claim 1 wherein the support comprises a plurality of cut-outs to reduce the mass of material forming the support.

16. The patch fitting of claim 15 wherein the support is configured to couple to a hinge for supporting the fire-retardant glass door and wherein the cut-outs are shaped and/or positioned such that the support comprises material extending between the first and second attachment means and a connection with the hinge.

17. A fire-retardant glass door comprising a patch fitting according to claim 1.

18. A patch fitting for a fire-retardant glass door, the patch fitting comprising:

a support sandwiched between a first layer of fire-retardant material on a first side of the support and a second layer of fire-retardant material on an opposing second side of the support;

wherein the support comprises:

a first attachment means for attaching to a first pane of glass of the fire-retardant glass door on the first side of the support; and a second attachment means for attaching to a second pane of glass of the fire-retardant glass door on the opposing second side of the support;

such that the patch fitting is configured, in use, to be at least partially sandwiched between the two panes of glass of the fire-retardant glass door, wherein the patch fitting comprises a first receiving portion and a second receiving portion, and wherein the patch fitting is configured to hold a first pane of glass in the first receiving portion with the first attachment means, and to hold a second pane of glass in the second receiving portion with the second attachment means, and wherein the first and second receiving portions are at least partially defined by recesses in at least one of (i) the support and (ii) respective first and second fire retardant layers on either side of the patch fitting.

19. A patch fitting for a fire-retardant glass door, the patch fitting comprising:

a support sandwiched between a first layer of fire-retardant material on a first side of the support and a second layer of fire-retardant material on an opposing second side of the support;

wherein the support comprises:

a first attachment means for attaching to a first pane of glass of the fire-retardant glass door on the first side of the support; and a second attachment means for attaching to a second pane of glass of the fire-retardant glass door on the opposing second side of the support;

such that the patch fitting is configured, in use, to be at least partially sandwiched between the two panes of glass of the fire-retardant glass door, wherein the support comprises a plurality of cut-outs to reduce the mass of material forming the support, and wherein the support is configured to couple to a hinge for supporting the fire-retardant glass door and wherein the cut-outs are shaped and/or positioned such that the support comprises material extending between the first and second attachment means and a connection with the hinge.

* * * * *